Dec. 14, 1926.  
S. H. WIGHTMAN ET AL  
1,611,094  
MACHINE FOR MANUFACTURING BLOCKS, ETC  
Filed March 14, 1924.   12 Sheets-Sheet 3

Fig. 4.

Inventors:
Sherburne H. Wightman.
Thomas A. Long.
by Darwin S Wolcott Atty.

Dec. 14, 1926.

S. H. WIGHTMAN ET AL 1,611,094

MACHINE FOR MANUFACTURING BLOCKS, ETC

Filed March 14, 1924    12 Sheets-Sheet 6

Dec. 14, 1926.  
S. H. WIGHTMAN ET AL  
1,611,094  
MACHINE FOR MANUFACTURING BLOCKS, ETC  
Filed March 14, 1924    12 Sheets-Sheet 7

Inventors:  
Sherburne H. Wightman.  
Thomas A. Long.  
by Darwin & Wolcott  Atty.

Dec. 14, 1926.  
S. H. WIGHTMAN ET AL  
1,611,094  
MACHINE FOR MANUFACTURING BLOCKS, ETC  
Filed March 14, 1924  12 Sheets-Sheet 8

Inventors:  
Sherburne H. Wightman.  
Thomas A. Long.  
by Darwin & Wolcott  
Atty.

Patented Dec. 14, 1926.

1,611,094

UNITED STATES PATENT OFFICE.

SHERBURNE H. WIGHTMAN AND THOMAS A. LONG, OF CHICAGO, ILLINOIS, ASSIGNORS TO INTERNATIONAL CONCRETE INDUSTRIES CORPORATION, OF CHICAGO, ILLINOIS, A CORPORATION OF DELAWARE.

MACHINE FOR MANUFACTURING BLOCKS, ETC.

Application filed March 14, 1924. Serial No. 699,205.

In the accompanying drawings forming a part of this specification, Figs. 2ᵃ, 2ᵇ and 2ᶜ illustrate the several steps in the operation of the tamper controlling and selecting devices; Fig. 6ᵃ is a sectional elevation on a plane indicated by the line 6ᵃ—6ᵃ, Fig. 4.

Figures 1, 2, 2A, 2B, 2C:
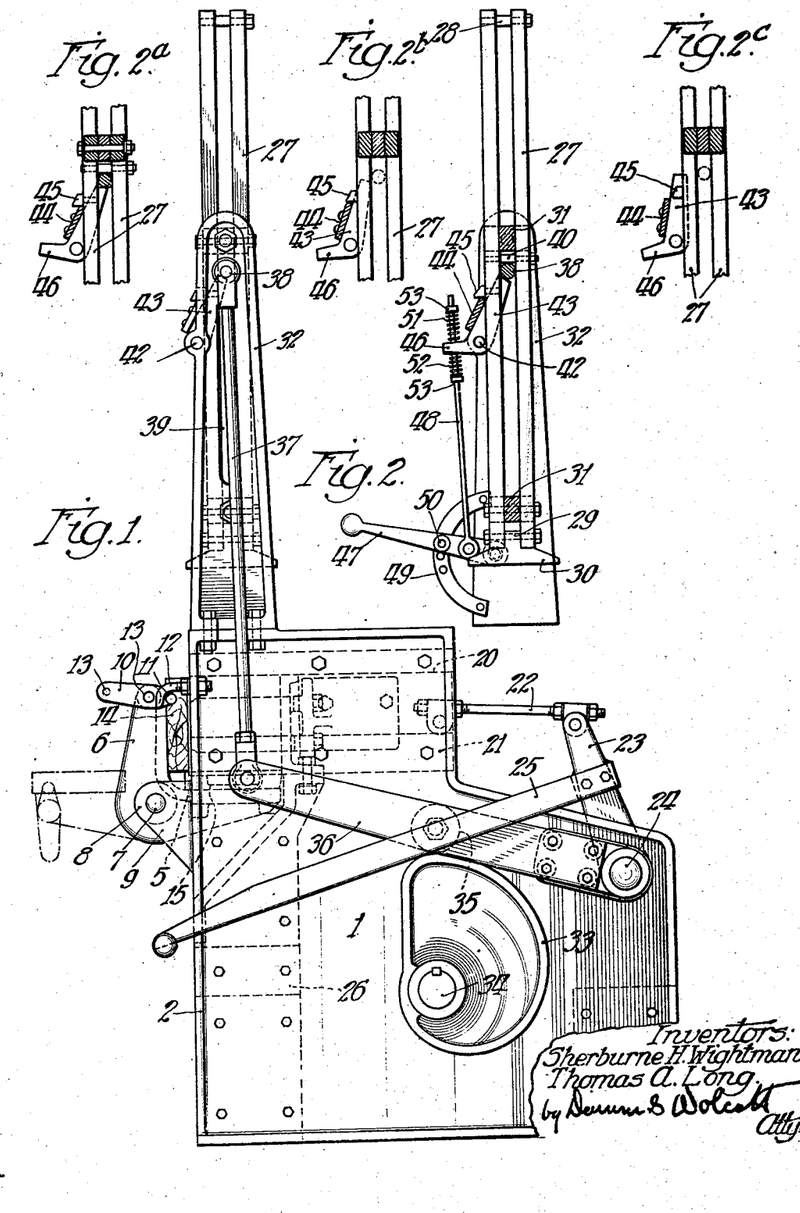
Fig. 1 is a side elevation of a tile or block machine embodying the improvements claimed herein.
Fig. 2 is a sectional elevation of the tamping member showing the manner of selecting the tampers to be used at different stages in the operation of forming a block.
Figure 3:
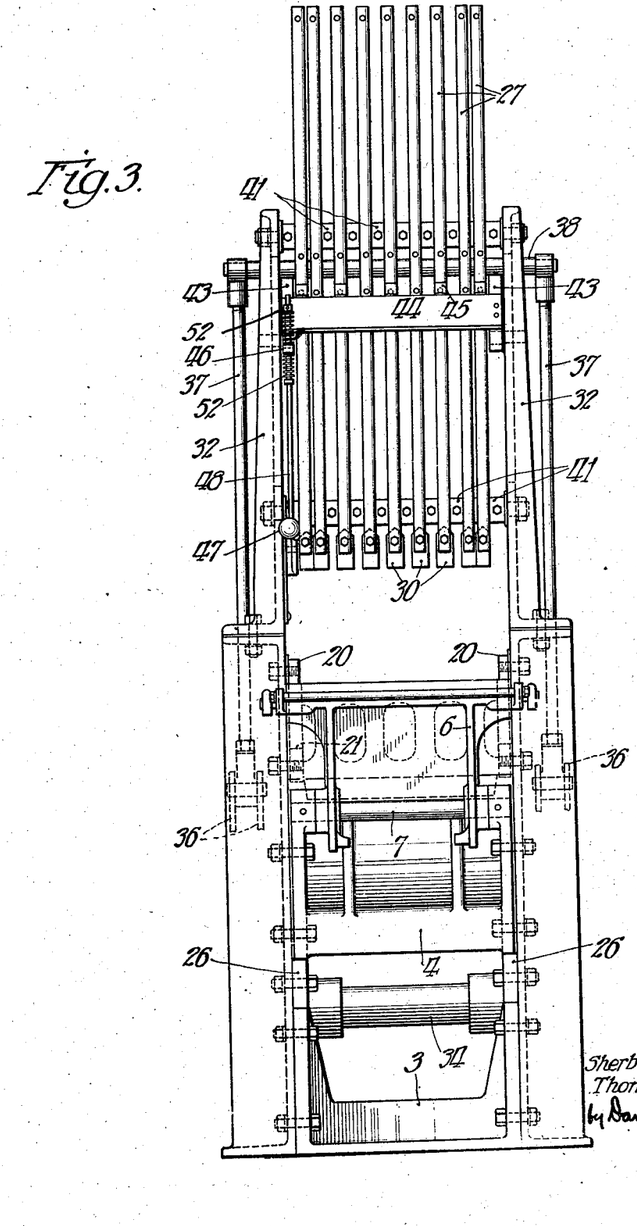
Fig. 3 is a front elevation of the machine.
Figure 5:
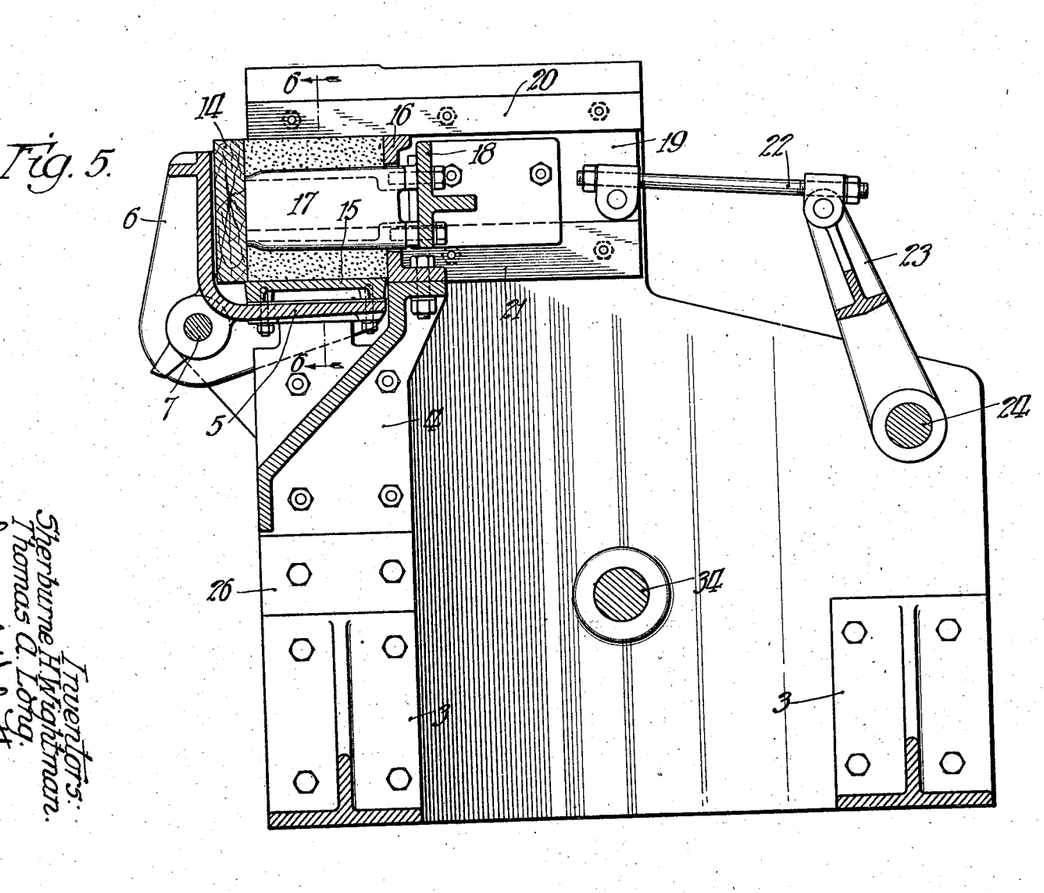
Fig. 5 is a sectional elevation, the plane of section being indicated by the line V—V, Fig. 4.

In the practice of the invention the sides of the machine consist of plates 1 preferably provided with peripheral stiffening flanges 2 and held in spaced relation by spacing blocks 3, to which the side plates are bolted or riveted. A casting 4 is also bolted and riveted to the side plates at the front of the machine and serves to hold the sides in spaced relation, and also to support the cradle consisting of members 5 and 6 arranged at right angles one to the other and adapted to form the bottom and one of the side walls of the mold. The cradle is carried by a shaft 7 having its ends mounted in bearings 8 formed in ears 9 formed on the cradle support or casting 4 which is recessed as shown in Figs. 1 and 5, to permit of the projection of the member 5 of the cradle into position under the tamping mechanism. It is preferred that the back wall of the recess in the cradle support should be inclined in order that any material falling outside of the mold may be discharged outside of the machine.

Figure 7:
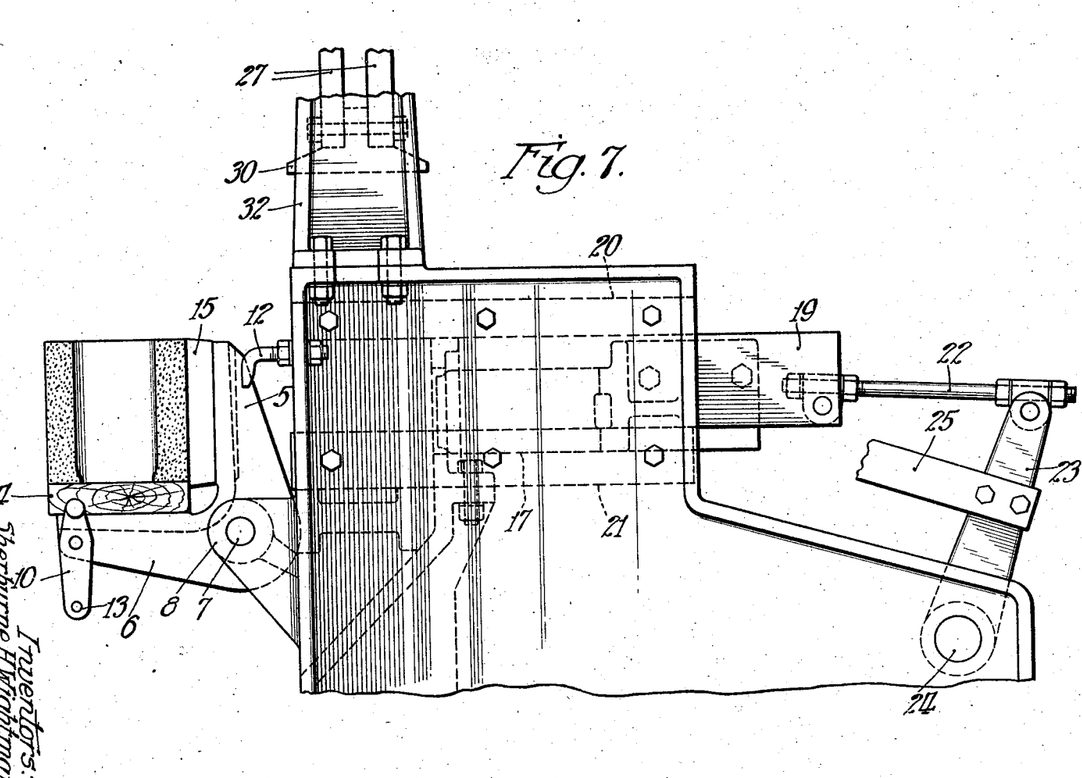
Fig. 7 is a side elevation of a portion of the machine showing the cradle turned out and supporting a completed block.
Figure 8:
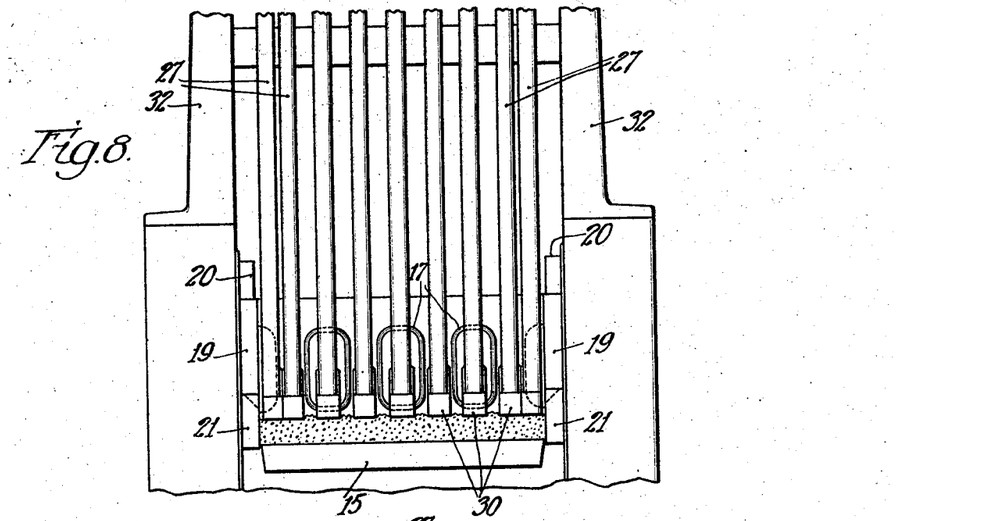
Figs. 8, 9 and 10 are sectional elevations illustrating successive stages in the formation of blocks.

In order to hold the cradle in position for forming a block, levers 10 are pivotally supported on the member adjacent to its upper edge, the inner ends of the levers being provided with fingers 11 adapted to be shifted into engagement with hooks 12 on the front of the machine. The outer ends of the levers are preferably connected by a rod 13 so that said levers may be operated simultaneously to lock and unlock the cradle. This rod also serves as a handle to shift the cradle. The member 6 serves as a support during the molding operation for a removable pallet 14, preferably formed of wood and adapted to serve as a support for the completed block while being removed from the cradle and during the hardening period. A pallet is placed on the member 6, while the cradle is turned out to the position shown in Fig. 7, after a completed block and its pallet have been removed. The bottom of the mold is preferably formed by a metal platen 15 detachably secured to the member 5 of the cradle.

The second or inner side wall of the mold is formed by a plate 16 having its lower edge bolted or otherwise secured to the casting or cradle support 4 as clearly shown in Fig. 5. When hollow blocks are to be formed this plate is provided with openings to permit of the movement of the cores 17 into and out of the mold, the plate in such case serving as a stripper to prevent deformation of the block when the cores are being withdrawn.

Figure 4:
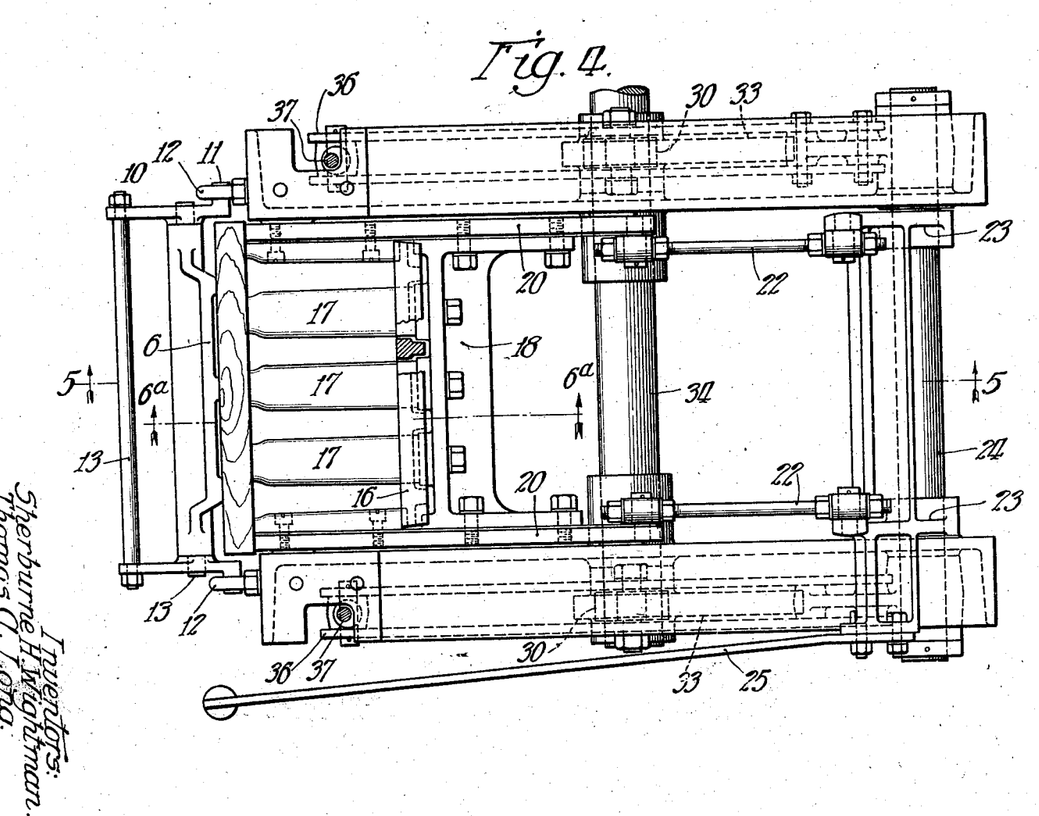
Fig. 4 is a plan view, the tampers being removed.

The cores 17 are secured to a cross-head 18 having its ends secured to slides 19 arranged between guide bars 20 and 21 secured to the sides of the machine. The slides are connected by pitmen 22 to arms 23 loosely mounted on the shaft 24 secured in suitable bearings in the sides 1 of the machine. The arms can be reciprocated to shift the sides and the head 18 by any suitable means, as for example, by a lever 25 having one end secured to one of the arms 23 and extending towards the front of the machine as shown in Figs. 1 and 4.

Figure 6:
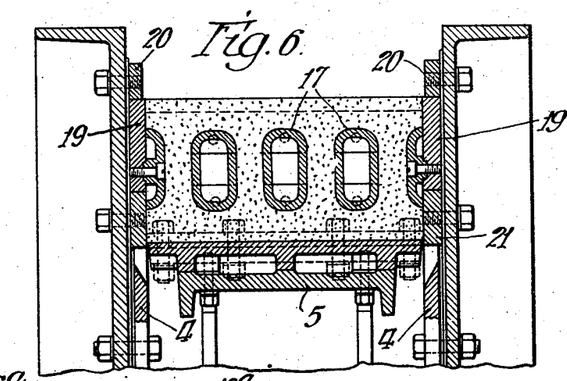
Fig. 6 is a transverse section on a plane indicated by the line VI—VI, Fig. 5.
Figure 6A:
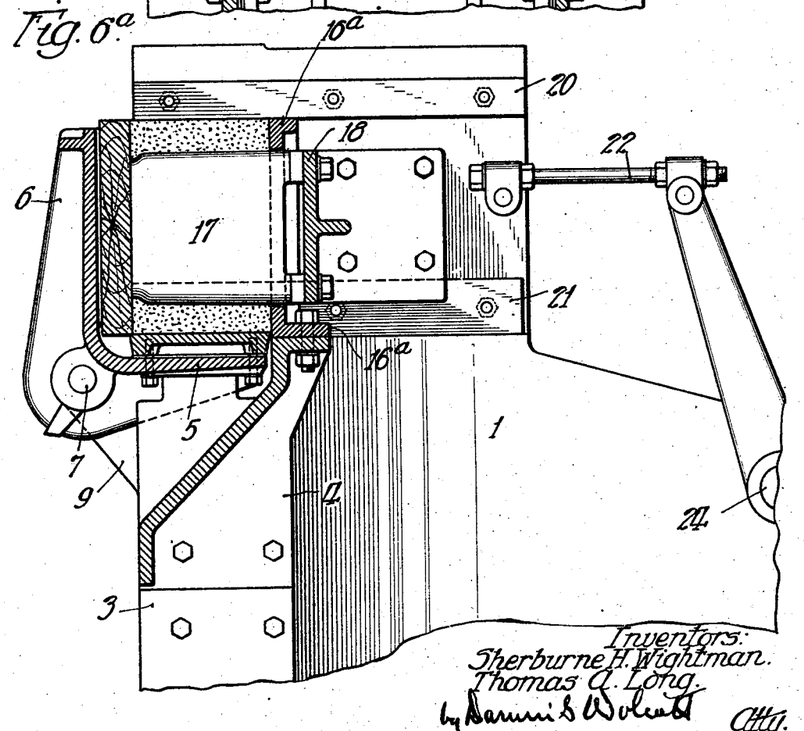

As shown in Fig. 6, the end walls of the mold are formed in part by the slides 19 when moved forward and in part by the lower guide bar 21.

When it is desired to form recesses in the ends of the blocks, half cores 17ª are secured to the slides 19 as shown in Fig. 6.

Figure 16:
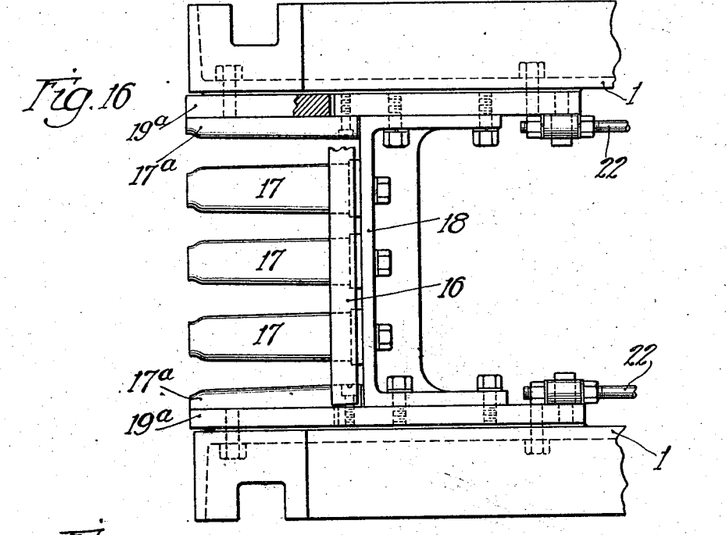
Figs. 16, 17, 18, 19 and 20 illustrate modifications in the construction of the end walls of the mold.
Figure 17:
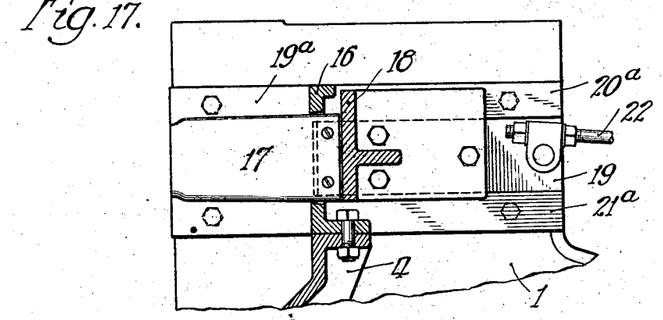
Figure 18:
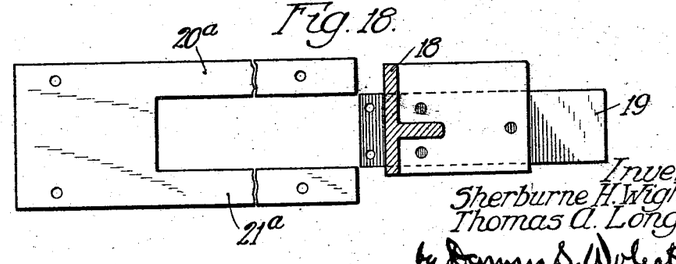
Figure 19:
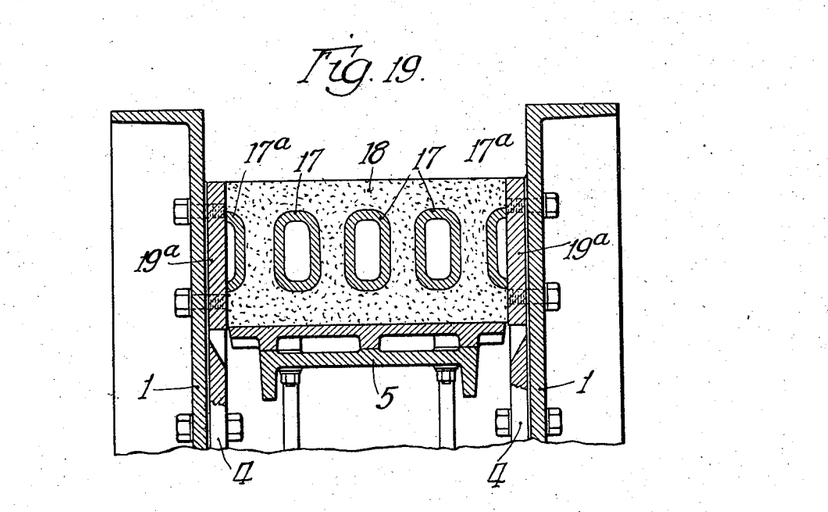
Figure 20:
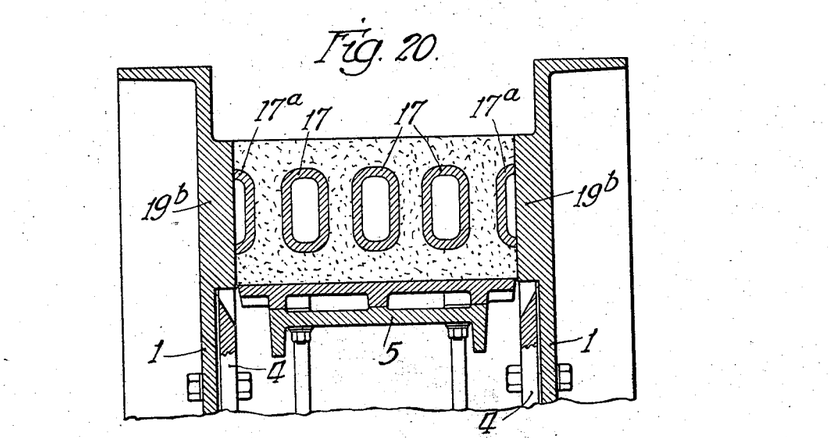

In lieu of utilizing the slides 19 and part of the lower guides 21 to form the ends of the mold, such ends may be formed by plates 19ª preferably formed integral with the forward ends of the guides 20ª and 21ª and securely bolted to the sides of the frame as shown in Figs. 16, 17, and 18. When employing such construction, the slides 19 are extended only a short distance beyond the cross, and to these extensions a are secured the half cores 17ª. In lieu of forming the end walls detachable from the sides of the frame of the machine, as shown in Figs. 16, 17, and 18 and 19, such sides may be formed with portions 19ᵇ projecting inwardly and adapted to form the end walls of the mold as shown in Fig. 20.

It will be observed that the member 5 of the cradle will receive the transmitted impact of the tampers and such stresses as are in part transmitted through the trunnion of the cradle to the cradle support 4. In order to relieve the sides of the machine of such transmitted strains, the cradle support is in turn supported by the front spacer block 3. When it is desired to make a small block, e. g., an eight inch block, spacers 26 are interposed between the lower ends of the cradle support and the front spacer block or anvil 3. When it is desired to make a larger block, e. g., a twelve inch block, the spacers 26 are removed and the cradle support lowered onto the anvil block as shown in Fig. 6ª. Another cradle having the member 6 correspondingly higher is mounted in the cradle support and a higher plate 16ª secured on the cradle support, the lower guide moved down and correspondingly wider slides 19ª substituted for the sides 19.

Each of the tamping members consists of a pair of rods 27 spaced a suitable distance apart at their upper ends by a sleeve surrounding the connecting bolt and at their lower ends by a lug 29 on the tamping shoe 30, the shoe being detachably connected to the rods by a bolt. The tampers are guided in their movements by flat bars 31 passing between the rods of the several pairs and having their ends secured to the standards 32 which are secured at their lower ends to the sides of the machine. The tampers are lifted to the desired height by a cam 23 on a driven shaft 34 mounted in suitable bearings in the sides of the machine. As shown in Fig. 1, this cam which operates on a roller 35 on the lever 36 loosely mounted on the shaft 24, is so constructed that the initial upward movement of the lever will be slow, and then gradually increase, to mid position, then gradually decrease and will then permit a free drop of the lever and the tampers. The free ends of the levers are connected by pitmen 37 to the ends of a shaft 38 which passes through slots 39 in the standards 32 and between the pairs of rods of the several tampers. This shaft when raised engages pins 40 passing through the rods as shown in Fig. 2.

Figure 9:
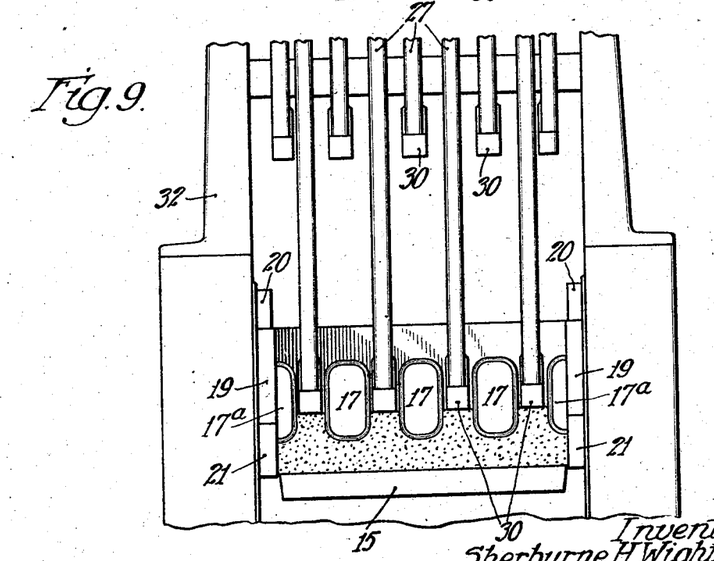
Figure 10:
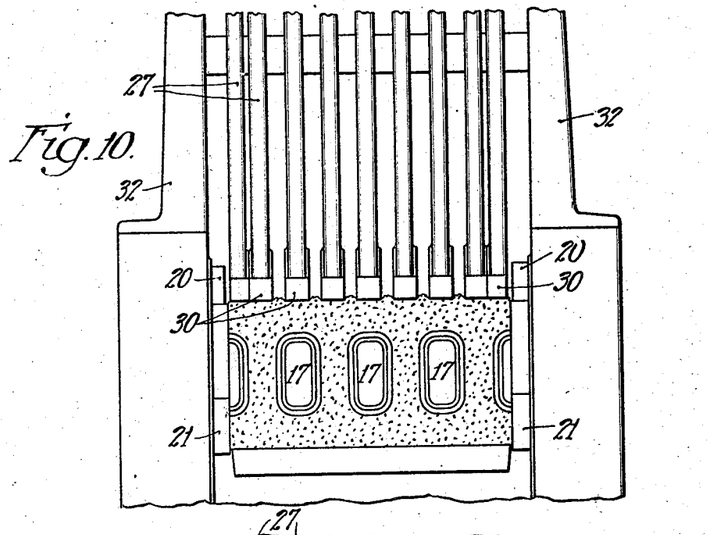

The shoes are made of a length substantially equal to the distance between the faces of the inner and outer side walls of the mold. The pairs of bars carrying the shoes are spaced suitable distances apart by means of blocks 41, carried by rods secured to the standards 32. When shaping hollow blocks the tamping members are so spaced and the shoes are made of such widths that the latter will pass between adjacent cores as shown in Fig. 9. As the series of tamping members extend the entire length of the mold, some of such members will be in line vertically with the cores, and hence provision is made to hold the tamping members in line with the cores in raised position; the other members are operated to tamp the material intermediate the cores. And further, as the tampers should not operate while a completed block is being removed and the cradle returned to operative position, provision is made for holding all the tampers and also a portion of the tampers in raised position. In the construction shown in Figs. 1 to 2ᶜ, studs 42 are secured to the standards 32 and on these studs are mounted fingers 43 adapted to be shifted under the shaft 38, when in raised position, as shown in Fig. 2. The fingers 43 are connected by bar 44 adapted to be shifted to position to engage lugs 45 on such of the tamping members as are in line vertically with the cores. These lugs project such a distance from the tampers that the fingers can be moved out of alinement with the shaft 38 while bar 44 is in engagement with the lugs 45 as shown in Fig. 2ᶜ. A desirable means for operating these devices consists in connecting an arm 46 on one of the fingers 43 to a lever 47 by a rod 48. This lever passes along a segment 49 and is provided with means as a pin 50 for engaging holes in the segment. These holes in the segment are so located that the fingers 43 may be held in engagement with the shaft 38, or by moving the lever 47 down to the next hole the fingers will be moved out of engagement with the shaft, but the bar 44 will remain in with the lugs 45. By a further movement of the lever 47 the bar 44 will be moved out of engagement with the lugs 45. It is preferred that the rod 48 should pass freely through the arm 46 and to arrange springs 51 and 52 above and below said arm, said springs bearing on opposite sides of the arm and collars 53 on the rod. In practice, the shaft 38 will be raised a short distance above the fingers and bar, and when the shaft drops down onto the fingers or bar, the upper spring 51 will serve as a cushion. In case the operating lever 47 is shifted while the shaft 38 or lugs 45 are below the fingers and bar, the lower spring will allow the fingers and bar to move outwardly.

Figure 11:
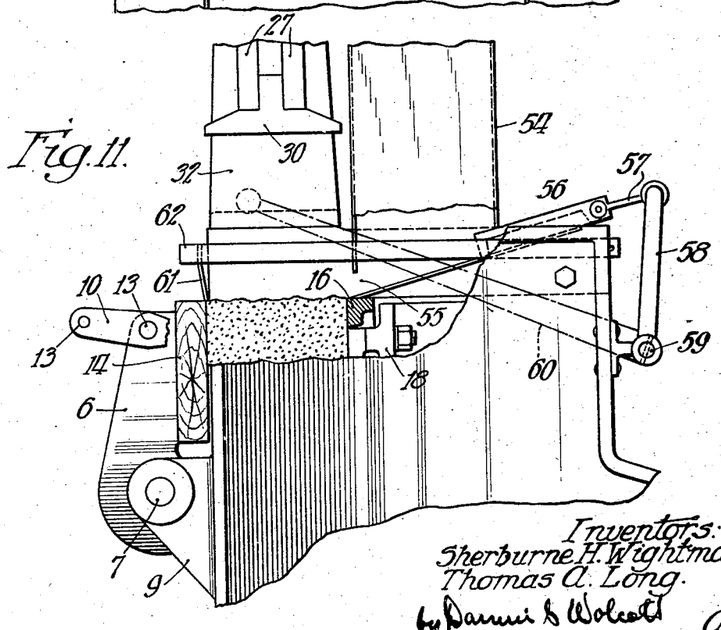
Fig. 11 is a view of the machine partly in side elevation and partly in section illustrating means for feeding material to the mold, and means for removing surplus material.
Figure 12:
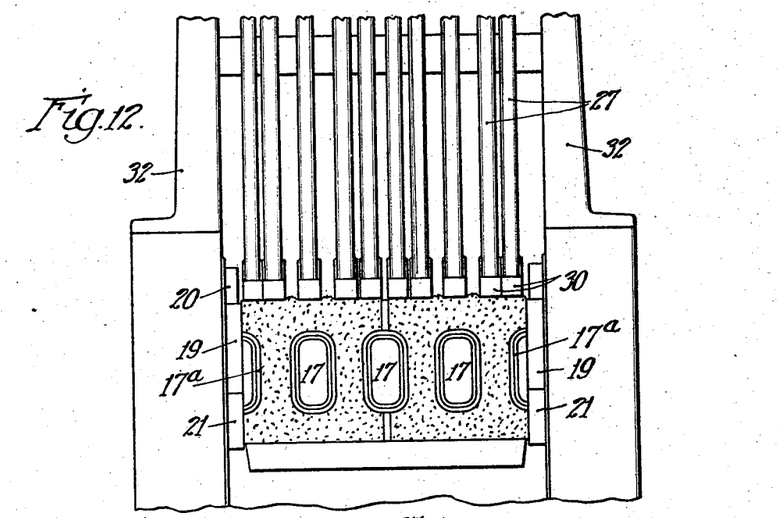
Figs. 12 and 13 are sectional views illustrating the manner of forming a plurality of blocks.
Figure 13:
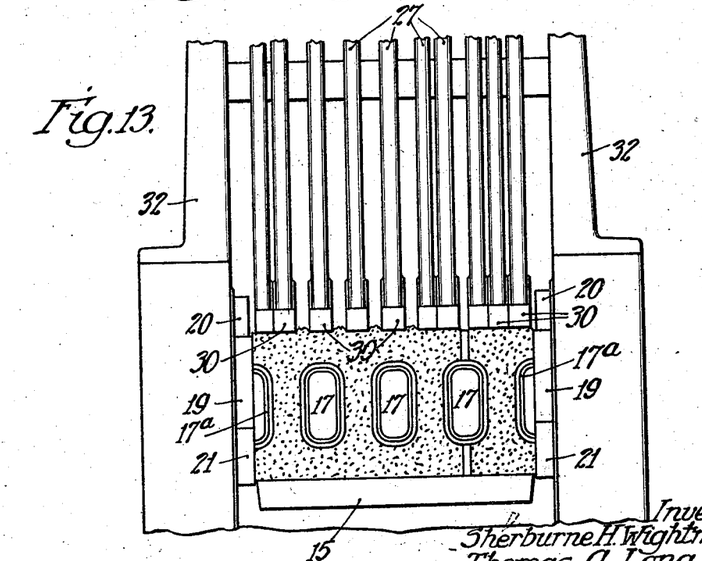

A hopper 54 for concrete or other material is arranged in such relation to the open side of the mold when in operative position, that the material can be forced through an opening 55 at the lower end of the hopper into the mold. The material is forced through this opening by a plunger 56. This plunger is connected by a link 57 to an arm 58 on the shaft 59, which can be rotated to reciprocate the plunger by a lever 60 extending toward the front of the machine, as shown in Fig. 11, or any other suitable means. It is desirable to remove surplus material from the block and to remove any ridges or unevenness produced by the tamping, and to that end a scraping blade 61 is secured to a slide 62 so that by the movement of the latter the blade will move across the block and remove all material projecting above the upper edges of the mold.

Figure 14:
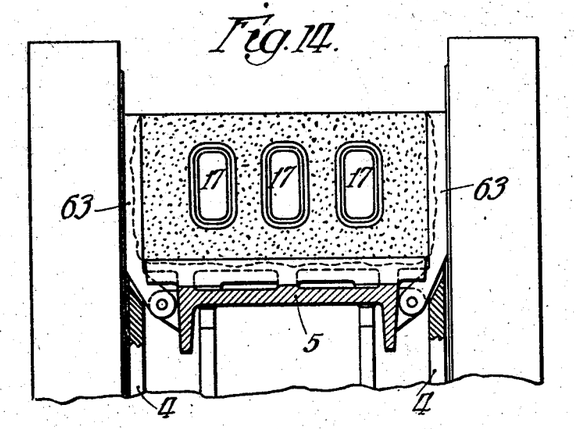
Figs. 14 and 15 show in section and side elevation a modification in the construction of the mold.
Figure 15:
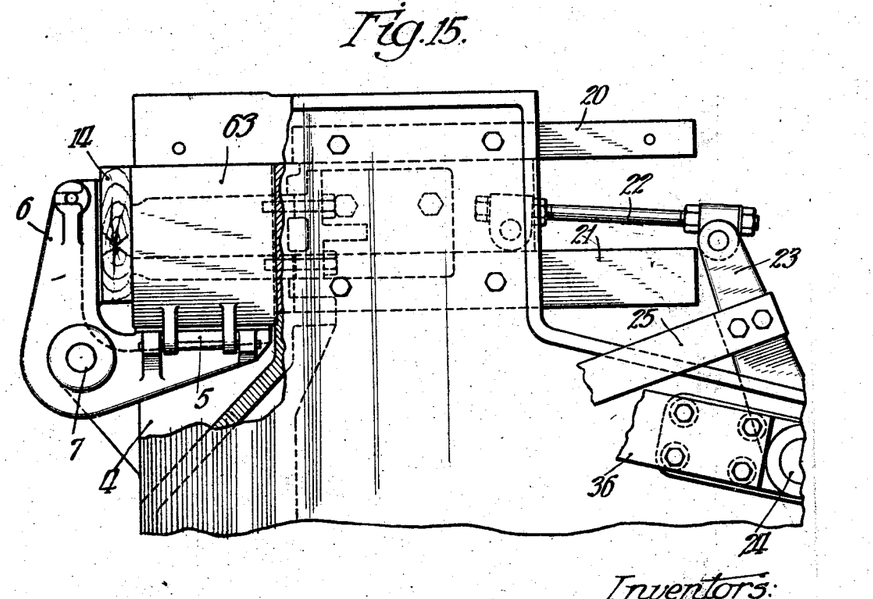

In lieu of forming the ends of the mold by slides 19, they may be formed by plates 63 hinged as shown in Figs. 14 and 15 to the member 5 of the cradle. When the cradle is turned outward for the removal of a completed block, the plates can be swung away from the block to permit of its removal. After a new pallet has been placed in position, the plates will be swung in so that when the cradle is turned to operative position the plates will slide along the sides of the machines and be held by such sides during the formation of the block.

The operation of forming hollow blocks will be readily understood by reference to Figs. 1, 8, 9, 10, 11, and 7. The cradle is turned to position as shown in Fig. 1 and a suitable amount of material fed into the mold by operating the plunger 56. The tampers are next released by moving the lever 47 down so as to shift the fingers 43 and bar 44 from in under the shaft 38 and lugs 45 respectively. Such release of the tampers will permit the latter to drop and be raised again by the cam and again drop, this operation being repeated as often as necessary to obtain the desired density of material. After the mold has been filled up to about the level of the underside of the cores, the lever 25 is operated to force the slides 19 and with them the head 18 and cores into position in the mold. Before the cores are shifted, however, the lever 47 will be raised so as to lock or tamp one core only in up position. After the cores have been shifted as above stated, the lever 47 is shifted so as to move the finger 43 from in under the shaft 38 but without passing from under the lugs 45, on tampers in line with the cores, thereupon such of the tampers as will pass between the cores are released and this operation is continued, material being fed in at suitable intervals until the packed material has risen, preferably slightly over the upper surface of the cores; thereupon the lever 47 is moved out so as to release the tampers heretofore supported by the bar 44 and the feeding of material and tamping are continued until the block has been completed; thereupon the scraper 61 is shifted to level off the top of the block. The handle or lever 25 is again operated to withdraw the cores and also move the slides 19 forming the ends of the mold from the block. The ends of the lever 10 are shifted to disengage the fingers 11 from the hooks 12 and the cradle is turned to the position shown in Fig. 7, the completed block resting upon the pallet which is then removed and a new pallet is inserted.

As the cradle forming the bottom and one side of the mold and the member 16 forming the opposite side of the mold, are carried by the casting 4, and as the portions forming the end walls of the mold bear against or are formed integral with the sides of the frame, in close proximity to the points of attachment of the casting 4 to the side of the frame, all stresses to which the mold walls are subjected in tamping are sustained by such casting.

We claim herein as our invention:

1. A machine for forming blocks, etc., having in combination a frame, a casting having its ends secured to the respective sides of the frame, plates adapted to form end walls of the mold laterally supported by portions of the frame adjacent to the location of the ends of the casting, a cradle having portions arranged at such an angle, one to the other, as to form the bottom and one side of the mold, and a plate adapted to form the other side of the mold, said cradle and plate being carried by the casting.

2. A machine for forming blocks, etc., having in combination a frame, a casting having its ends secured to the respective sides of the frame, plates adapted to form end walls of a mold laterally supported by portions of the frame adjacent to the location of the ends of the casting, a cradle having portions arranged at such an angle one to the other as to form the bottom and one side of the mold, and so mounted on the casting that one portion is movable between the end plates when the cradle is shifted to and from operative position, and a plate adapted to form the second side of the walls of the mold secured to the casting.

3. A machine for forming blocks, etc., having in combination a frame, plates adapted to form the ends of the mold so laterally supported by the frame, as to be held in contact with the ends of the completed block during the separation of the block and mold, a movable cradle having portions arranged at such an angle one to the other as to form the bottom and a side of a mold and so mounted in the frame that one portion will pass between the end plates when the cradle is shifted to and from operative position, and a plate carried by the frame adapted to form the second side of the mold.

4. A machine for forming blocks, etc., having in combination a frame, a cradle having portions arranged at an angle one to the other and adapted to form the bottom and side of a mold and so pivotally mounted in the frame as to be shiftable through an arc of ninety degrees, a plate secured to the frame and forming the rear wall of the mold, and plates adapted to form end walls of the mold and means for shifting the plates while in contact with the ends of the completed block, thereby giving a finished surface to the latter.

5. A machine for forming blocks, etc., having in combination a frame, a recessed casting supported between the sides of the frame, a cradle having portions arranged at an angle one to the other and adapted to form the bottom and a side wall of the mold, said cradle being pivotally mounted on the casting to move through an arc of ninety degrees, a plate forming the rear walls of the mold secured to the casting, and plates movable relative to the cradle and forming the end walls of the mold.

6. A machine for forming blocks, etc., having in combination a frame, a recessed casting supported between the sides of the frame, a cradle having portions arranged at an angle one to the other, and adapted to form the bottom and a side wall of the mold, said cradle being pivotally mounted on the casting to move through an arc of ninety degrees, a plate forming the rear wall of the mold secured to the casting, plates slidably mounted in the frame and adapted to form the end walls of the mold.

7. A machine for forming blocks, etc., having in combination a frame, a recessed casting detachably supported between the sides of the frame, a cradle having portions arranged at an angle one to the other, and adapted to form the bottom and a side wall of the mold, said cradle being pivotally mounted on the casting to move through an arc of ninety degrees, a plate forming the rear wall of the mold secured to the casting and plates movable relative to the cradle and forming the end walls of the mold.

8. A machine for forming blocks, etc., having in combination a frame, a cradle having portions arranged at an angle the one to the other, to form the bottom and a side of a mold and so pivotally mounted as to be shiftable through an arc of ninety degrees, a plate forming the rear wall of the mold carried by the frame and having openings therethrough, cores, a slide carrying said cores, and plates adapted to form the end walls of the mold and means for moving the plates in a direction parallel with the movement of the cores while the plates are in contact with the ends of the completed block.

9. A machine for forming blocks, etc., having in combination a frame, a cradle having portions arranged at an angle one to the other as to form a bottom and a side of the mold, and so pivotally mounted as to be shiftable through an arc of ninety degrees, a plate forming the rear wall of the mold carried by the frame and having openings therethrough, cores, plates laterally supported by the frame and adapted to form the end walls of the mold and a slide carrying said cores and plates.

10. A machine for forming blocks, etc., having in combination a frame, a cradle having portions arranged at an angle the one to the other to form the bottom and a side wall of the mold and so pivotally mounted as to be shiftable through an arc of ninety degrees, a plate forming the rear wall of the mold carried by the frame and having openings therethrough, slides movably mounted on the frame and adapted to form the end walls of the mold, and cores carried by said slides.

11. A machine for forming blocks, etc., having in combination a frame, a mold carried by said frame, slotted tamping bars, a shaft passing thru the slots in said bars, means for raising said shaft to lift the bars the desired height and permitting its free drop, fingers movable to position to support said shaft, means operative by the fingers for engaging a portion of the bars and holding the same in raised position.

In testimony whereof, we have hereunto set our hands.

SHERBURNE H. WIGHTMAN.
THOMAS A. LONG.